May 13, 1969　　　　J. WERNER ET AL　　　　3,443,307
METHOD OF PRODUCING A FLEXIBLE PROTECTION TUBE FOR A FLEXIBLE
SHAFT GUIDED IN THE TUBE WITH RADIAL PLAY
Filed Feb. 2, 1968
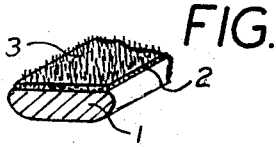
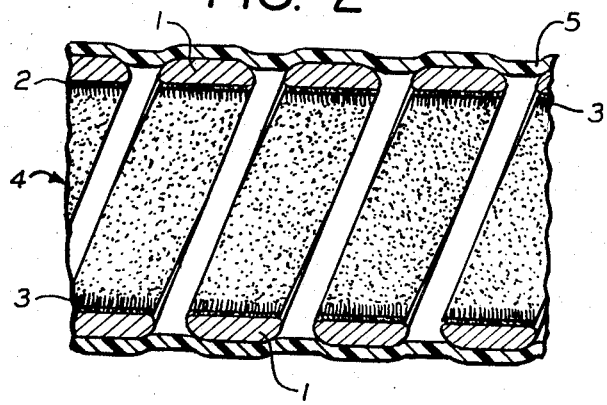
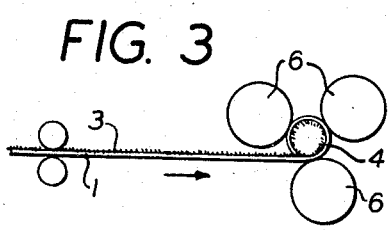
INVENTORS
JOHANNES WERNER
HANS GOLDE
HORST SCHLICK
BY
ATTORNEY.

United States Patent Office
3,443,307
Patented May 13, 1969

3,443,307
METHOD OF PRODUCING A FLEXIBLE PROTECTION TUBE FOR A FLEXIBLE SHAFT GUIDED IN THE TUBE WITH RADIAL PLAY
Johannes Werner, Offenbach, and Hans Golde and Horst Schlick, Frankfurt am Main, Germany, assignors to VDO Tachometer Werke Adolf Schindling GmbH, Frankfurt am Main, Germany, a corporation of Germany
Filed Feb. 2, 1968, Ser. No. 702,720
Claims priority, application Germany, Feb. 2, 1967, V 32,896
Int. Cl. B23p 17/00; F16c 1/26, 1/06
U.S. Cl. 29—527.2       2 Claims

ABSTRACT OF THE DISCLOSURE

A method of producing a flexible protection tube for a flexible shaft guided in the tube with radial play, the protection tube comprising a helix of profile wire and having inside a soft-elastic resilient, brush-like layer, which comprises the steps of applying a glue layer to the profile wire, subjecting the profile wire to electrostatic flocking to obtain a brush-like layer, which comprises a plurality of short fibers or lamellae, and forming the flocked profile wire, after hardening of the glue layer to the wire helix of the protective tube.

---

The present invention relates to a method of producing a flexible protection tube for a flexible shaft guided in the tube with radial play, in general, and to such protection tube which comprises a profile wire helix and which has inside a soft-elastic resilient brush-like layer for noise damping purposes, as clearly disclosed in the co-pending patent application, Ser. No. 539,495, filed Apr. 1, 1966, now U.S. Patent No. 2,389,579, issued June 25, 1968, in particular.

The mentioned co-pending application relates to an arrangement of the mentioned soft-elastic, resilient, brush-like layer inside of the protection tube and/or on a shaft guided in the protection tube with play, whereby this layer comprises a plurality of short elastic fibers or lamellae consisting of abrasion-proof material and secured individually on the shaft or in the protection tube radially or about radially. The mentioned co-pending patent application defines furthermore a method of producing such shaft in a protection tube, which comprises the steps of applying at first a layer of hardenable glue and on the latter a plurality of short fibers or lamellae by means of electrostatic flocking. The purpose of this arrangement of the protection tube and of the shaft, which are designed particularly for flexible drive shafts of vehicle tachometers, is an extensive damping of the noises created during rotation of the metallic flexible shaft in the protection tube.

While the production of the brush-like layer on the flexible shaft by electrostatic flocking in the continuous process is relatively simple, a flocking of the inner wall of the finished protection tube is possible only in connection with relatively short pieces and is not performable for greater lengths in the continuous process.

It is, therefore, one object of the present invention to provide a method of producing a flexible protection tube for a flexible shaft guided in the tube with radial play, wherein the production of the flexible protection tube with a flocking inside in accordance with the teaching of the co-pending patent application, is possible in great lengths.

It is another object of the present invention to provide a method of producing a flexible protection tube for a flexible shaft guided in a tube with radial play, wherein at first on a profile wire a glue layer and then a brush-like layer consisting of a plurality of short fibers or lamellae are applied by electrostatic flocking and after hardening of the glue, the flocked profile wire is formed to a wire helix of the protection tube. It is suitable, to flock the profile wire with the brush-like layer only on the side, forming the inner face of the protection tube, after its changing to a wire helix. This wire helix, produced in a known manner endlessly and flocked on the inside, is then covered with a protection hose of synthetic material and is rolled up in large rolls, from which then the individual protection tubes, for instance, for drive shafts of tachometers are cut to the required lengths.

With these and other objects in view, which will become apparent in the following detailed description, the present invention will be clearly understood in connection with the accompanying drawing, in which:

FIGURES 1a and 1b are fragmentary perspective views of the raw profile wire prior to and after a one-sided flocking, respectively;

FIG. 2 is an axial section of a portion of the finished protection tube; and

FIG. 3 is a schematic sketch disclosing the rolling of the profiled wire to a helix.

Referring now to the drawings, and in particular to FIG. 3, on a raw profile wire 1, supplied in form of large rolls, in the continuous process a glue layer 2 is applied to the side forming the inner side of the protection tube and which side is thereafter flocked with short fibers or lamellae of an abrasion-proof synthetic material in a known manner. Then the flocked profile wire runs for about three minutes in an about 15 meter long dry path and is rolled up thereafter again in large rolls. For the mass manufacture, a greater number, for instance, ten such continuous paths can be provided adjacent each other in a flocking device.

From these prefabricated flocked profile wire rolls, as in the manufacture of normal helical springs, the profile wire 1 is rolled between form rollers 6 (FIG. 3) to a wire helix 4 and thereafter is covered with an elastic, thermoplastic layer of synthetic material 5, which is pulled in during cooling slightly into the intermediate spaces between the windings of the wire helix 4. This finished protection tube is also rolled up as an intermediate product at first in large rolls and then, for instance, is worked further into protection tubes for flexible drive shafts of tachometers.

The forming of the flocked profile wire to a wire helix can be performed immediately after the drying step. The passing speed is, however, during rolling of the wire helix so appreciably greater, that the joining of the working steps does not pay.

While we have disclosed one embodiment of the present invention, it is to be understood that this embodiment is given by example only and not in a limiting sense, the scope of the present invention being determined by the objects and the claims.

We claim:
1. A method of producing a flexible protection tube for a flexible shaft guided in the tube with radial play, said protection tube comprising a helix of profile wire and having inside a soft-elastic resilient, brush-like layer, comprising the steps of
   applying a glue layer to said profile wire,
   subjecting said profile wire to electrostatic flocking to obtain a brush-like layer comprising a plurality of short fibers or lamellae, and
   forming said flocked profile wire, after hardening of said glue layer to said wire helix of said protection tube.
2. The method, as set forth in claim 1, wherein
   said step of subjecting said profile wire to electrostatic flocking is performed only on the side forming the inner face of said protection tube after its forming to a wire helix.

References Cited

UNITED STATES PATENTS

| | | | |
|---|---|---|---|
| 2,430,081 | 11/1947 | Roberts et al. | |
| 2,497,696 | 2/1950 | Smith | 117—17 X |
| 3,194,702 | 7/1965 | Geller et al. | |
| 3,214,995 | 11/1965 | Gilmore | 74—501 |
| 3,261,225 | 7/1966 | Crouse | 64—2 X |
| 3,389,579 | 6/1968 | Werner et al. | 64—2 |

JOHN F. CAMPBELL, *Primary Examiner.*

PAUL M. COHEN, *Assistant Examiner.*

U.S. Cl. X.R.

29—456, 458; 64—3; 72—46; 74—501; 117—17